March 25, 1924.
C. F. OTT
1,488,278
PROCESS OF RECOVERING GASES WHICH ARE FORMED DURING THE DESTRUCTIVE DISTILLATION OF WOOD
Filed Feb. 2, 1921
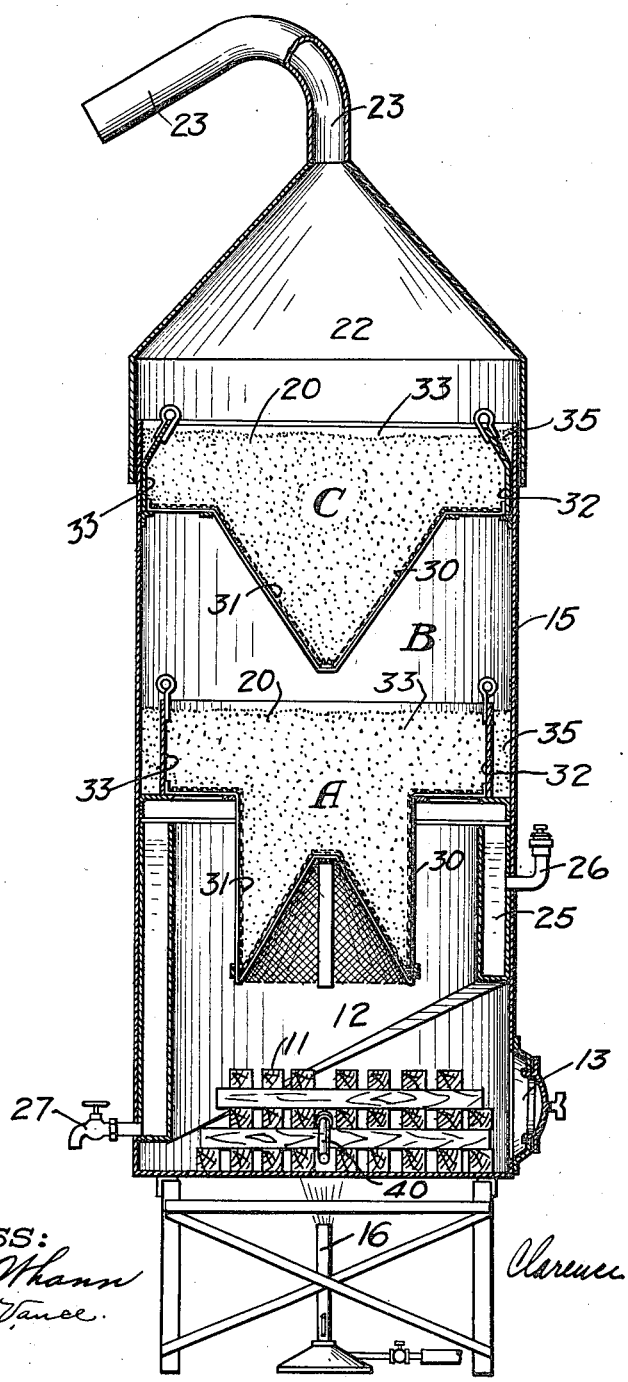

Patented Mar. 25, 1924.

1,488,278

UNITED STATES PATENT OFFICE.

CLARENCE F. OTT, OF WHITTIER, CALIFORNIA.

PROCESS OF RECOVERING GASES WHICH ARE FORMED DURING THE DESTRUCTIVE DISTILLATION OF WOOD.

Application filed February 2, 1921. Serial No. 441,837.

*To all whom it may concern:*

Be it known that I, CLARENCE F. OTT, a citizen of the United States, and resident of Whittier, in the county of Los Angeles and State of California, have invented a new and useful Process of Recovering Gases Which are Formed During the Destructive Distillation of Wood, of which the following is a specification.

This invention relates to the process of recovering gases which are formed during the destructive distillation of wood whereby the said gases are subjected to decomposition under high temperatures and subsequently passed through loosely disposed granular substances impregnated with certain chemical elements thereby causing the replacement or substitution, of certain of their component elements with others desirable to the production of compounds of greater utility.

This invention has for its object the reducing of a heretofore complex series of operations to a continuous action whereby the elements being treated are delivered in their finished state.

Referring to the drawing which is of a diagrammatic nature, and the figure of which is a cross section of retort used in the carrying out of the features of my invention, similar characters represent similar parts throughout the drawings.

Materials comprising or containing the basic substance it is intended to subject to destructive evolution, such as the white oak billets 11, are placed within the volatilization chamber 12 through the door 13 of the retort 15. Due to heat supplied by a burner 16, or other suitable means, the temperature within the chamber 12 is raised and maintained at from 150° to 350° C. which is sufficient to cause the vaporization of the most volatile of the elemental compounds constituent of the material used until same are exhausted, then the temperature is raised to care for those volatilizing at higher temperatures in their respective order.

The gases created thereby collect within the chamber 12 and are forced, due to their expansive pressure, into the oxidation mass A where they are brought into contact with the impregnated surfaces of the granular substance 20 composing the oxidizing mass and are changed in their chemical composition. From the oxidizing mass A the vapors are forced into the mixing chamber B where further change takes place, and through the oxidizing mass C where they are subjected to still further oxidation, and are finally given off into the hood 22 from whence they are delivered by the outlet spout 23, either for direct use or for condensation.

For the purpose of increasing the effectiveness of oxidation I provide water vapor, which also has the purpose of lowering the boiling point, and which mixes with the gases arising from the material 11 and enters the oxidizing mass with same. A means of supplying this vapor is by the use of a circular pan 25 which has a feed spout 26 and a drain-cock 27.

In order that the gases may freely enter the oxidizing mass, I support the granular substance comprising same upon a frame 30 covered with a mesh screen 31, which construction in combination with a supporting annular member 32, forms removable trays 33 which may be readily lifted, upon the removal of the hood 22, from their respective positions and the oxidant easily removed. To prevent the possible passage of any of the vapors around the trays 33, my construction provides sealing strips 35 which are filled with the granular oxidant. A thermometer well 40 provides access to the interior of the chamber 12 for a heat registering instrument in order that the thermal condition therein may be controlled.

White oak wood is preferable as a cellulose base from which to obtain the acids and aldehydes here-in-after given because of its very high content of methyl alcohol, which is 30 per cent by weight of the wood, but any cellulose containing substance may be used.

The oxidizing mass must necessarily be of a silicate nature, and must be absolutely free of any sulphur or chlorine or any of their derivatives in order to obtain the desired results. A composition which gives good results and does not pack sufficiently to retard the passage of gases is that of decomposed granite to which has been added a saturated solution of permanganate of potassium, which is a very effective oxidant. This gives a composition which adheres quite closely to the following proportions:

| | |
|---|---|
| Nitrogen | .01% |
| Moisture | 2.49 |
| Loss on ignition | 6.54 |
| Silica, $SiO_2$ | 60.21 |
| Aluminum oxide | 18.40 |
| Sodium oxide | .25 |
| Potassium oxide | .11 |
| Iron oxide | 6.75 |
| Calcium oxide | 3.28 |
| Magnesium oxide | 1.96 |
| | 100.00% |

Plus a saturated solution of potassium permanganate.

Acetone which is the first element to volatilize, vaporizes at a temperature of 56° C., oxidizes to formic acid and acetic acid in mass A, and is carried through the chamber B and mass C without further change. Other of the less volatile elements require greater exposure to the action of the oxidant and do not become completely transformed until their passage through chamber B and mass C.

The following derivative gases are produced from the cellulose base hereinbefore stated and are oxidized to acids and aldehydes following:

| No. | Elemental compound. | Temperature centigrade. | Oxidizes in— | To— |
|---|---|---|---|---|
| 1 | Acetone | 56 | A | Formic acid and acetic acid. |
| 2 | Methyl alcohol | 66 | A | Formaldehyde. |
| 3 | Toluene | 110 | A | Benzoic acid. |
| 4 | Acetic acid | 118 | | No change. |
| 5 | Xylene | 142 | ABC | Meta-phthalic and para-phthalic acid. |
| 6 | Mesitylene | 164 | | Trimesitic acid. |
| | Pseudocumene | 169.8 | ABC | |
| 7 | Cymene | 175 | ABC | Para-phthalic acid. |
| 8 | Phenol | 180 | AA | Ortho-dihydroxy benzene. |
| 9 | Benzyl alcohol | 180 | ABC | Benzoic aldehyde. |

It is evident from the foregoing that in my method I decompose, or cause the evolution of gases by the application of external heat, as is done in present methods of fractional distillation, but before these gases can be condensed I pass them through an oxidizing mass, thereby changing the vaporized compound by oxidation, and then the changed or oxidized gas passes through to the condenser or to other desirable application.

As my invention I claim:

1. In the treatment of gases resulting from the process of destructive distillation volatilizing white oak billets in an enclosed chamber, then subjecting the derived vapors to oxidation, and then condensing the oxidized vapors.

2. In the treatment of gases resulting from the process of destructive distillation consisting in volatilizing white oak billets in an enclosed chamber, then subjecting the derived vapors to oxidation by passing same through loosely disposed granular substance impregnated with oxidizing agents.

3. In the treatment of gases resulting from the process of destructive distillation consisting in volatilizing white oak billets in an enclosed chamber, then subjecting the derived vapors to oxidation by passing same through decomposed granite impregnated with oxidizing agents.

4. In the treatment of gases resulting from the process of destructive distillation consisting in volatilizing white oak billets in an enclosed chamber, then subjecting the derived vapors to oxidation by passing same through decomposed granite impregnated with a saturated solution of potassium permanganate substantially as set forth.

5. In the treatment of gases resulting from the process of destructive distillation consisting in volatilizing white oak billets in an enclosed chamber in the presence of water vapors, then subjecting the derived vapors to oxidation and then condensing the oxidized vapors.

6. In the treatment of gases resulting from the process of fractional distillation consisting in volatilizing white oak billets at their proper temperatures of volatilization of constituent parts, then subjecting the vapors derived therefrom to oxidation and then condensing the oxidized vapors.

7. In the treatment of gases resulting from the process of fractional distillation consisting in volatilizing white oak billets in the presence of water vapors at their proper temperatures of volatilization of constituent parts and then subjecting the vapors derived therefrom to oxidation before being condensed.

8. In the treatment of gases resulting from the process of fractional distillation consisting of vaporizing wooden billets in the presence of water vapors at their proper temperatures of volatilization of their constituent parts and then subjecting the vapors derived therefrom to oxidation by passing through loosely disposed granular substance impregnated with permanganate of potassium.

9. In the treatment of gases resulting from the process of fractional distillation wherein basic elements are vaporized in the presence of water vapors at the respective temperatures of volatilization of its constituent parts and then subjecting the vapors derived therefrom to oxidation by passing through decomposed granite impregnated with a saturated solution of potassium permanganate.

10. In the treatment of gases resulting from the process of fractional distillation consisting of vaporizing white oak billets in the presence of water vapors at the respective temperatures of volatilization of its constituent parts and then subjecting the vapors derived therefrom to oxidation by passing through decomposed granite impregnated with oxidizing agents.

11. The process of oxidation consisting in passing gases derived from wood through granular substances impregnated with permanganate of potassium.

12. The process of oxidation consisting in passing gases derived from wood through granular substances impregnated with permanganate of potassium in the presence of water vapors.

13. The process of oxidation consisting in passing gases derived from wood through decomposed granite impregnated with permanganate of potassium.

14. The process of oxidation consisting in passing gases derived from wood through decomposed granite impregnated with a saturated solution of potassium permanganate substantially as set forth.

Signed at Los Angeles, in the county of Los Angeles and State of California, this 24 day of January, 1921.

CLARENCE F. OTT.

Witnesses:
JESSE P. WHANN,
S. CONRADI VANCE.